(12) United States Patent
Hidaka et al.

(10) Patent No.: US 7,783,705 B2
(45) Date of Patent: Aug. 24, 2010

(54) FRAME TRANSFER METHOD AND NODE IN ETHERNET

(75) Inventors: Youichi Hidaka, Tokyo (JP); Makoto Shibutani, Tokyo (JP); Atsushi Iwata, Tokyo (JP); Masaki Umayabashi, Tokyo (JP); Nobuyuki Enomoto, Tokyo (JP)

(73) Assignee: NEC Corporation, Tokyo (JP)

( * ) Notice: Subject to any disclaimer, the term of this patent is extended or adjusted under 35 U.S.C. 154(b) by 1103 days.

(21) Appl. No.: 10/642,197

(22) Filed: Aug. 18, 2003

(65) Prior Publication Data

US 2004/0039832 A1   Feb. 26, 2004

(30) Foreign Application Priority Data

Aug. 22, 2002 (JP) ............... 2002-242529

(51) Int. Cl.
G06F 15/16 (2006.01)
H04L 12/28 (2006.01)
H04L 12/56 (2006.01)

(52) U.S. Cl. .......... 709/206; 709/230; 370/389; 370/392

(58) Field of Classification Search .......... 709/206, 709/230
See application file for complete search history.

(56) References Cited

U.S. PATENT DOCUMENTS

| | | | |
|---|---|---|---|
| 5,400,331 A * | 3/1995 | Lucak et al. ............... 370/401 |
| 6,058,419 A * | 5/2000 | Taniguchi ................... 709/223 |
| 6,181,699 B1 | 1/2001 | Crinion et al. .............. 370/392 |
| 6,339,595 B1 | 1/2002 | Rekhter et al. |
| 6,526,056 B1 * | 2/2003 | Rekhter et al. .............. 370/392 |
| 6,760,776 B1 * | 7/2004 | Gallo et al. ................. 709/238 |
| 6,788,681 B1 * | 9/2004 | Hurren et al. ............... 370/389 |
| 7,072,346 B2 * | 7/2006 | Hama .................... 370/395.53 |
| 2003/0037163 A1 * | 2/2003 | Kitada et al. ................ 709/236 |
| 2004/0066780 A1 * | 4/2004 | Shankar et al. ............. 370/389 |
| 2004/0066781 A1 * | 4/2004 | Shankar et al. ............. 370/389 |
| 2004/0151120 A1 * | 8/2004 | Shankar et al. ............. 370/249 |

FOREIGN PATENT DOCUMENTS

| | | |
|---|---|---|
| JP | 2001-320420 | 11/2001 |
| JP | 2002-164937 | 6/2002 |

OTHER PUBLICATIONS

Chinese Office Action dated Nov. 14, 2008 (with partial English translation).

* cited by examiner

*Primary Examiner*—John B. Walsh
(74) *Attorney, Agent, or Firm*—McGinn IP Law Group, PLLC

(57) ABSTRACT

A node to relay the Ethernet frame provided with means to insert, in the relay process of the frame, two or more VLAN tags into the frame at a time and to remove the inserted VLAN tags wherein a TTL area to show the frame survival time is provided in the VLAN tag to be inserted to the frame so that whether the survival time has been elapsed or not is checked by the value in the TTL area and the frame after elapse of the survival time is discarded without being relayed.

18 Claims, 18 Drawing Sheets

FIG. 6

| MAC SOURCE ADDRESS (48 BITS) | FIRST STEP TAG INFORMATION (32 BITS) | SECOND STEP TAG INFORMATION (32 BITS) | ... | N STEP TAG INFORMATION (32 BITS) | NUMBER OF TAG CONTROL STEPS | TAG CONTROL INFORMATION | OUTPUT PORT INFORMATION |
|---|---|---|---|---|---|---|---|
| 00-00-0c-01-02-03 | OPERATION TAG TYPE | OPERATION INFORMATION | ... | OPERATION INFORMATION | 4 | TAG INSERTION | 1 |
| 00-00-0c-01-02-04 | BUS PROVISIONING TAG TYPE | BUS PROVISIONING INFORMATION | ... | BUS PROVISIONING INFORMATION | 4 | TAG REPLACEMENT | 1 |
| ... | ... | ... | ... | ... | ... | ... | ... |
| 00-00-0c-01-02-05 | ADDRESS INFORMATION TAG TYPE | ADDRESS INFORMATION | ... | ADDRESS INFORMATION | 3 | TAG INSERTION | 2 |
| 00-00-0c-01-02-05 | FAILURE AVOIDANCE TAG TYPE | BYPASS INFORMATION | ... | BYPASS INFORMATION | 2 | TAG INSERTION | 2 |
| 00-00-0c-01-02-05 | FAILURE NOTICE TAG TYPE | DEVICE FAILURE INFORMATION | ... | DEVICE FAILURE INFORMATION | 2 | TAG INSERTION | 2 |
| 00-00-0c-01-02-05 | MAINTENANCE TAG TYPE | MAINTENANCE INFORMATION | ... | MAINTENANCE INFORMATION | 4 | TAG REMOVE | 0 |

410

FRAME TRANSFER METHOD AND NODE IN ETHERNET

BACKGROUNDS OF THE INVENTION

1. Field of the Invention

The present invention relates to a node to relay the Ethernet frame and a frame transfer method.

2. Description of the Related Art

Conventionally, a node in Ethernet is controlled with a network control frame shown in FIG. 18 storing the network control information 12006 in the payload section and the address of the node to be controlled in the MAC address (Destination MAC address 2001 and the source MAC address 2002) and the IP address (IP address of controlled terminal 12004).

Therefore, while the user uses the entire network bandwidth for data transmission, the node cannot send the control frame. In addition, the control frame needs to have at least 64 bytes regardless of the control information amount for the node according to Ethernet standard specified by IEEE802.3.

IEEE802.1Q, that provides for the technology related to the VLAN, specifies that a VLAN tag shall be given to a frame during frame relay for network separation.

Therefore, the node that relays conventional Ethernet frames has a function to process at most one VLAN tag at a time in frame relay and the forwarding table to store the VLAN tag information given during such frame relay assures an information area for one VLAN tag only.

In addition, since the VLAN tag in the frame is the information for network separation, the node that relays the frame with VLAN tag does not have a function to change the contents of the VLAN tag. The information in the VLAN tag is used for frame transfer only.

Further, in transmission of the VLAN frame at the data link layer, the frame is relayed and the transfer port is determined by reference to the MAC address and the VLAN ID.

The conventional node control in Ethernet as described above has drawbacks as follows:

Firstly, the conventional node in Ethernet as specified in IEEE802.3 is controlled using the frame storing the control information in the payload section and the address of the node to be controlled in the MAC address and the IP address as shown in FIG. 18. Thus, while the user uses the entire network bandwidth for data transmission, the node cannot send the control frame.

Secondly, the control frame needs to have at least 64 bytes regardless of the control information amount for the node according to Ethernet standard. If the control frame is frequently sent in the network, it may oppress the bandwidth of the user data.

Thirdly, when the VLAN tag is given for frame transfer, several VLAN tags cannot be provided because there is no information area in the forwarding table.

Fourthly, in case a loop network is formed in IEEE802.3 Ethernet, because a function to discard frames when a loop of packet transfer is generated in VLAN packet transfer at the data link layer has not been realized, the looped packets occupy the network or induce oppression of the packet memory in the system, which results in unstable status of the network.

SUMMARY OF THE INVENTION

A first object of the present invention is to propose a frame transfer method and a node in Ethernet that enable transmission of the network control information from the node even while the user is using the network.

A second object of the present invention is to propose a frame transfer method and a node in Ethernet that can minimize oppression of the network bandwidth caused by transmission of the network control information by enabling transmission of the minimum information regardless of the frame restriction.

A third object of the present invention is to propose a frame transfer method and a node in Ethernet that can send a large information amount including the network control information as tags by enabling provision of several tags in frame transfer.

A fourth object of the present invention is to enable discarding of frames in VLAN packet transfer at the data link layer and to thereby propose a frame transfer method and a node in Ethernet that prevent the network to be unstable by avoiding occupation of the network by looped packets and oppression of the packet memory in the system.

According to the first aspect of the invention, a node to relay the Ethernet frame comprising element which inserts two or more VLAN tags into the frame and removes the inserted VLAN tag in the relay process of the frame.

In the preferred construction, a node further comprises element which replaces two or more VLAN tags of the frame at a time.

In another preferred construction, a node further comprises element which administrates the two or more VLAN tags using the forwarding table memory for change of frame contents during frame relay.

In another preferred construction, a node further comprises element which searches the forwarding table memory using the information from two or more VLAN tags in the frame during frame relay.

In another preferred construction, a node further comprises element which searches the forwarding table memory in the relay process of the frame with combining the information from two or more VLAN tags in the frame and the input port, the destination MAC address, the source MAC address and the TYPE field information.

In another preferred construction, a node comprises element which provides a TTL area to show the survival time of the frame in the VLAN tag inserted to the frame and checks whether the survival time has elapsed or not by the value in the TTL area and discards the frame after elapse of the survival time without relaying it in the relay process of the frame.

In another preferred construction, a node further comprises element which decrements the value in the TTL area by one every time the frame is relayed.

In another preferred construction, node control information is stored to the VLAN tag.

In another preferred construction, a node further comprises element which changes the self-node status administration corresponding to the contents of the VLAN tag.

In another preferred construction, the node status is stored to the area of the VLAN tag in the relayed frame corresponding to the self-node status.

According to another aspect of the invention, a frame transfer method of the node to relay the Ethernet frame comprising a step of inserting two or more VLAN tags to the frame at a time or removing the inserted VLAN tags in the relay process of the frame.

In the preferred construction, a forwarding table memory for frame contents change during frame relay is used for administration of the two or more VLAN tags.

In another preferred construction, a forwarding table memory is searched during frame relay using the information from two or more VLAN tags in the frame.

In another preferred construction, a forwarding table memory is searched in the relay process of the frame-with combining the information from two or more VLAN tags in the frame and the input port, the destination MAC address, the source MAC address and the TYPE field information.

In another preferred construction, a TTL area to show the survival time of the frame is provided in the VLAN tag that is inserted to the frame and whether the survival time has been elapsed or not is checked by the value in the TTL area and the frame after elapse of the survival time is discarded without being relayed in the relay process of the frame.

In another preferred construction, the value in the TTL area is decremented by one every time the frame is relayed.

In another preferred construction, node control information is stored to the VLAN tag.

In another preferred construction, a frame transfer method further comprises changing the self-node status administration corresponding to the contents of the VLAN tag.

In another preferred construction, node status is stored to the VLAN tag area in the relayed frame corresponding to the self-node status.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 6 is a configuration diagram of a table memory in the forwarding table memory;

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Referring to the attached figures, embodiments of the present invention will be described in details below.

Figure 1:
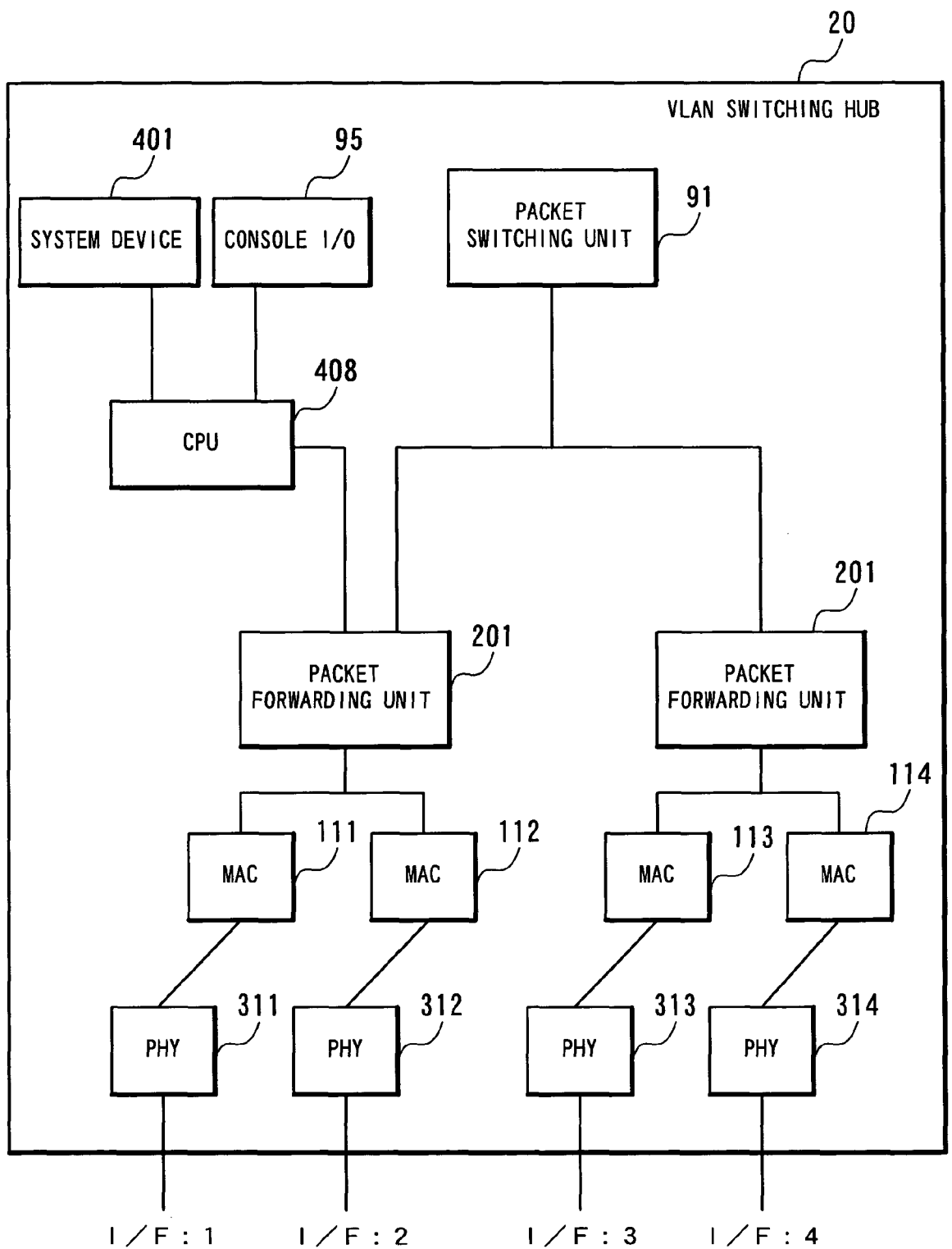
FIG. 1 is a block diagram showing the configuration of a VLAN switching hub according to an embodiment of the present invention.

FIG. 1 is a configuration diagram of a VLAN switching hub in the node to relay the Ethernet frame as an application of the present invention. The VLAN switching hub comprises a packet forwarding unit 201, a system device 401, a console I/O 95 and a packet switching unit 91 and is provided with MAC layer interfaces 111 to 114 and PHY layer interfaces 311 to 314.

Figure 2:
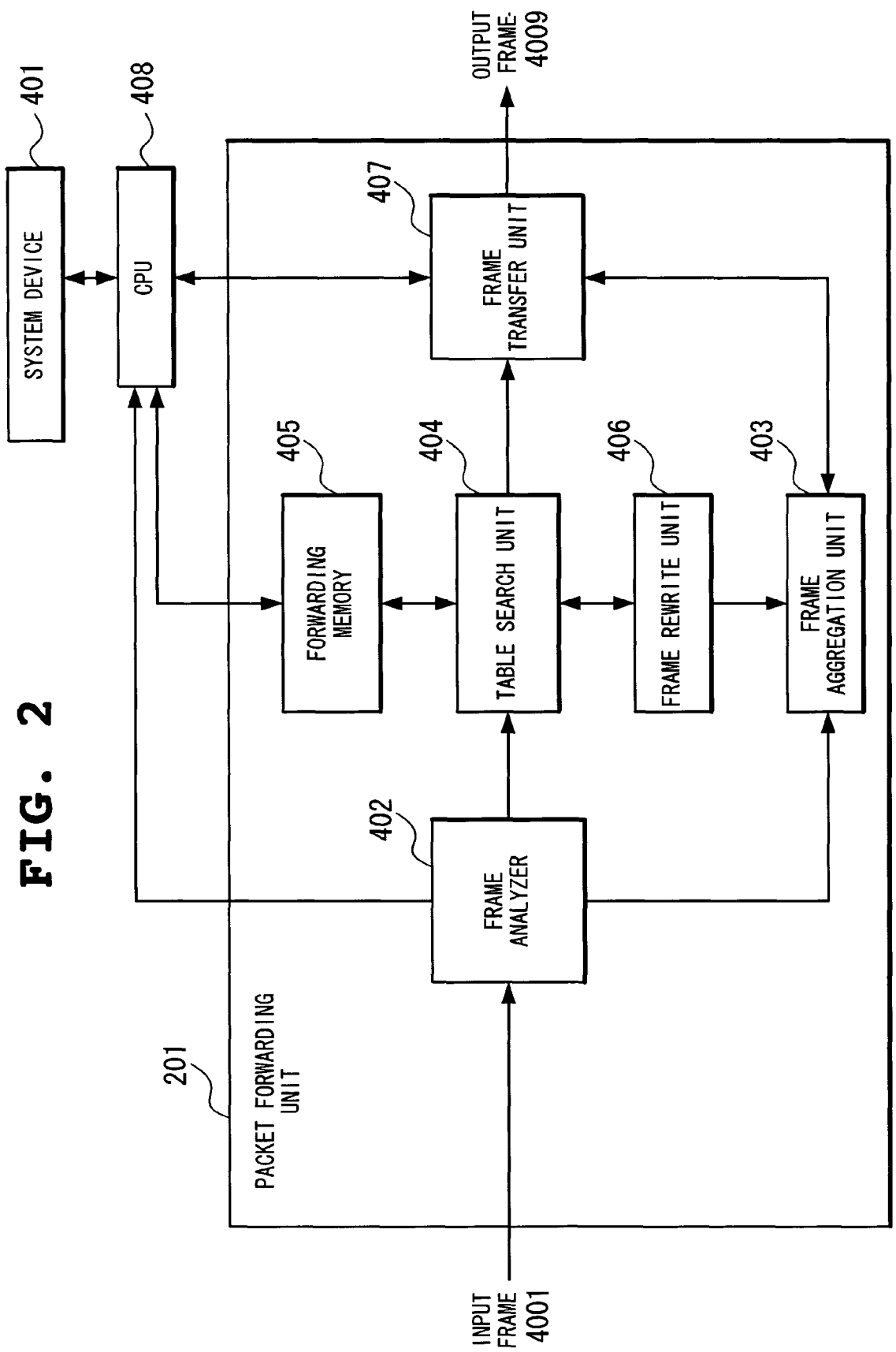
FIG. 2 is a block diagram showing the configuration of a packet forwarding unit according to an embodiment of the present invention.

FIG. 2 shows the configuration of the packet forwarding unit 201. The packet forwarding unit 201 comprises a frame analyzer 402, a forwarding table memory 405, a table search unit 404 and a frame rewrite unit 406 having the characteristic function of the present invention in addition to a frame aggregation unit 403 and a frame transfer unit 407.

Figure 15:
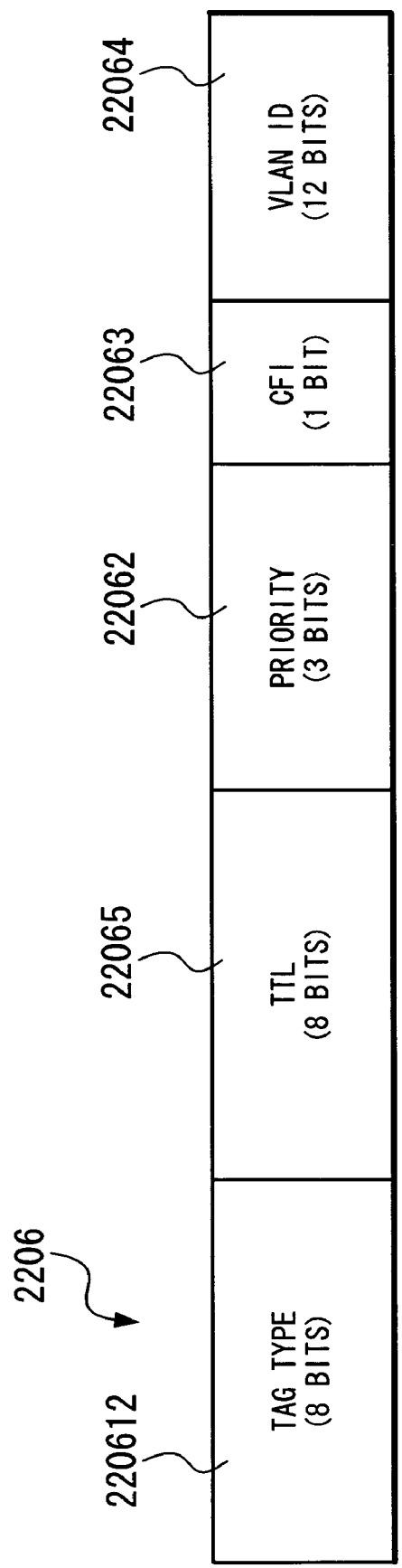
FIG. 15 is a configuration diagram of a tag according to the present invention.
Figure 16:
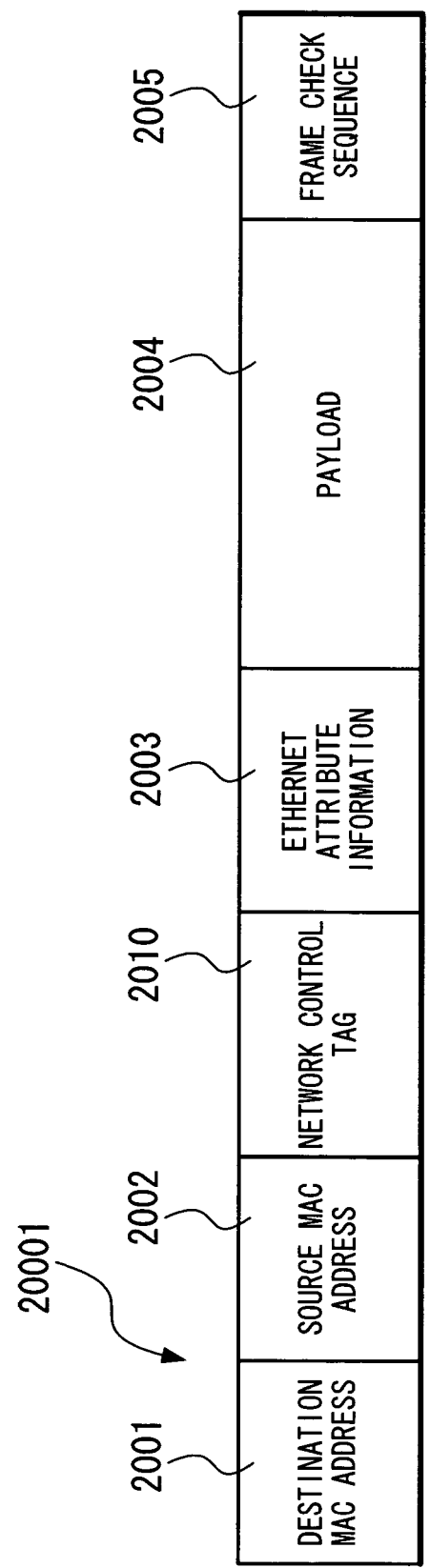
FIG. 16 is a configuration diagram of a network control frame according to the present invention.
Figure 17:
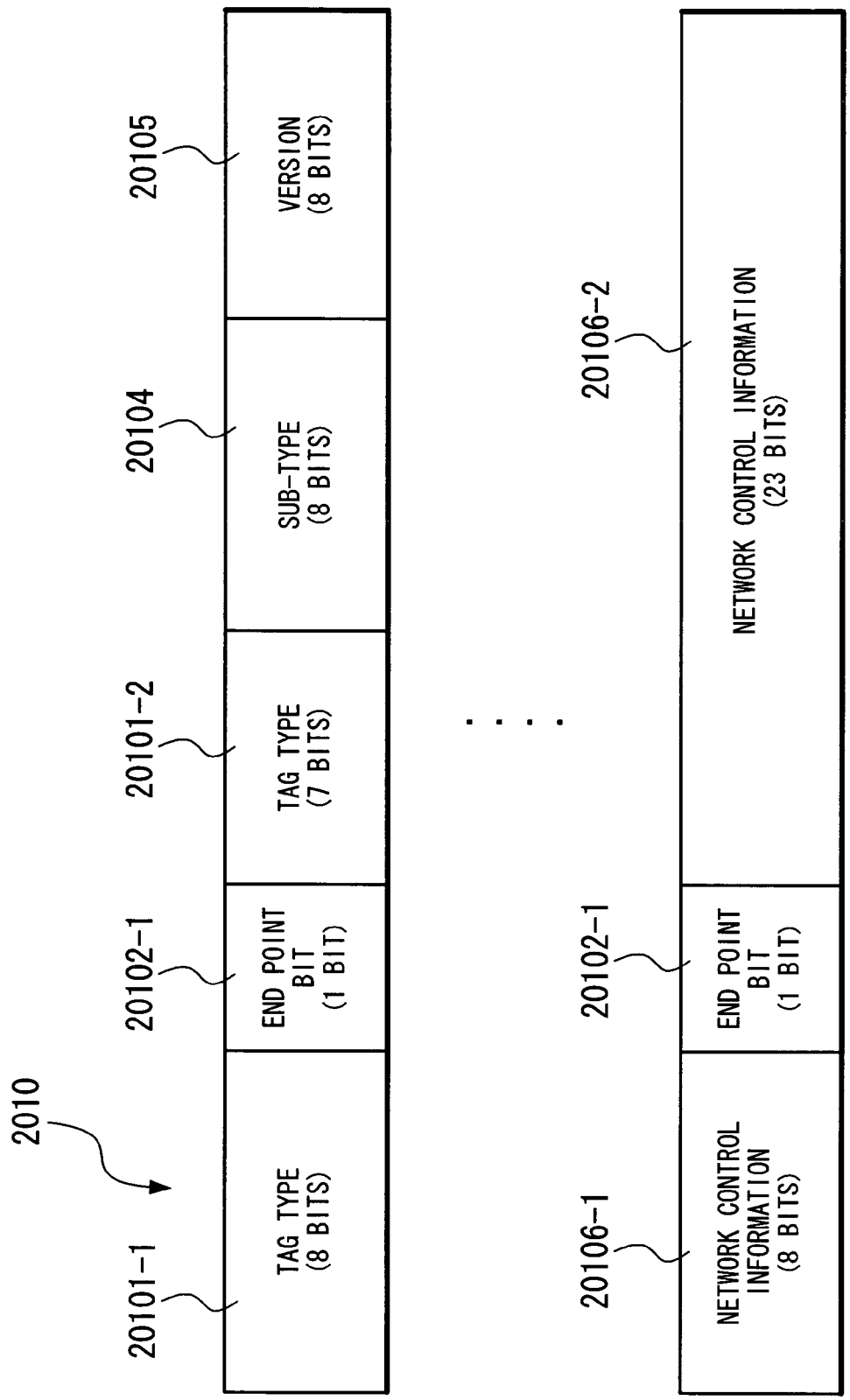
FIG. 17 is a configuration diagram of a network control tag according to the present invention.
Figure 18:
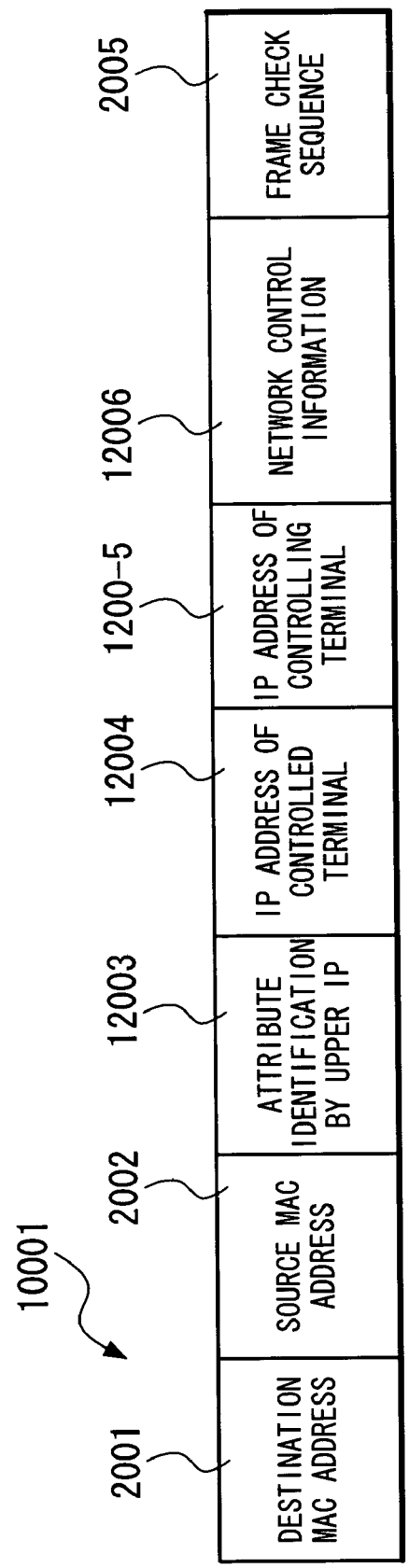
FIG. 18 is a configuration diagram of a standard network control frame.

The present invention further uses a VLAN tag frame utilizing a tag format with TTL bit 2206 as shown in FIG. 15 and an IEEE802.3 network control frame 20001 as shown in FIG. 16 utilizing a network control tag format 2010 as shown in FIG. 17.

Figure 3:
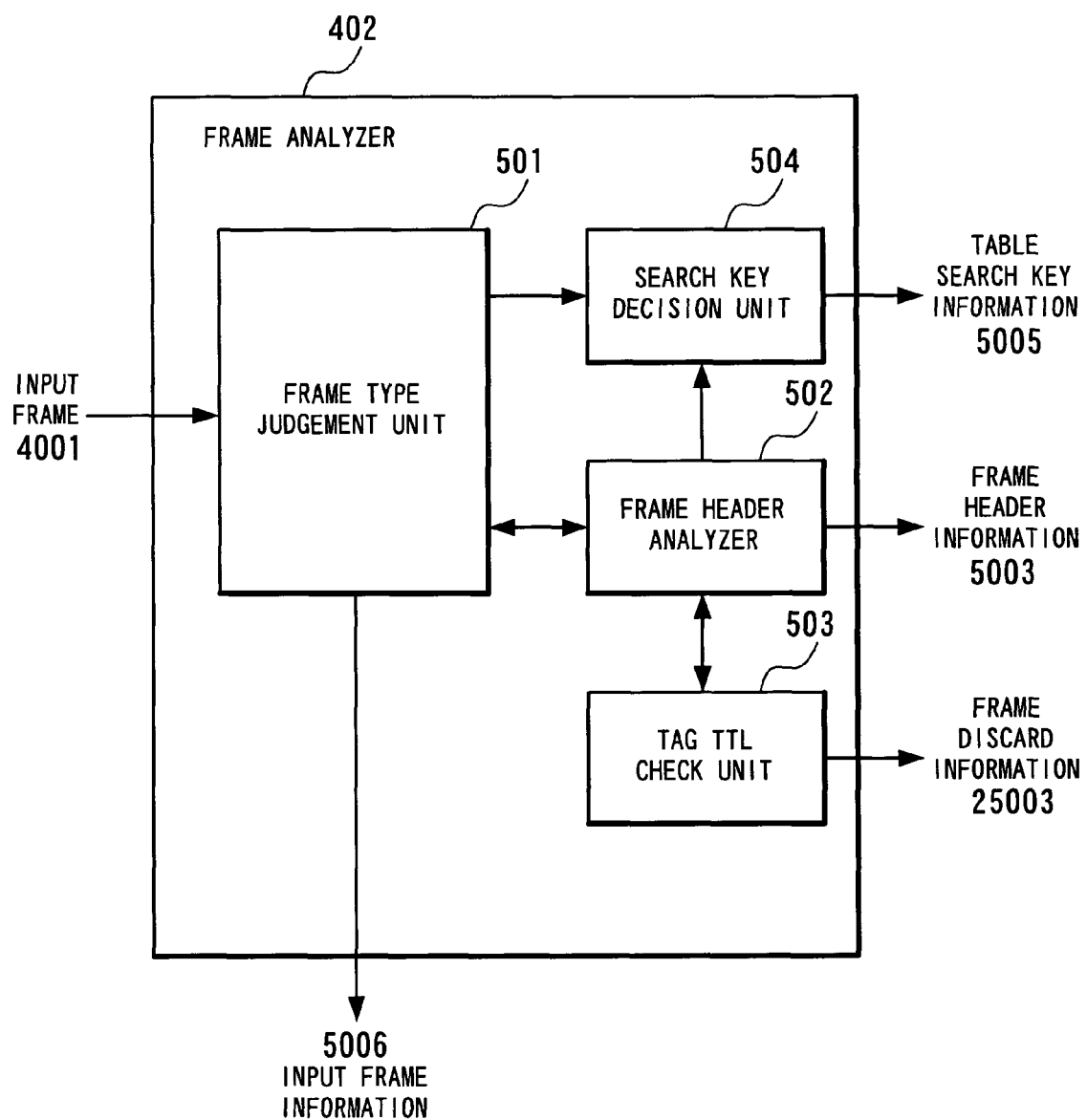
FIG. 3 is a block diagram showing the configuration of a frame analyzer in the packet forwarding unit.
Figure 7:
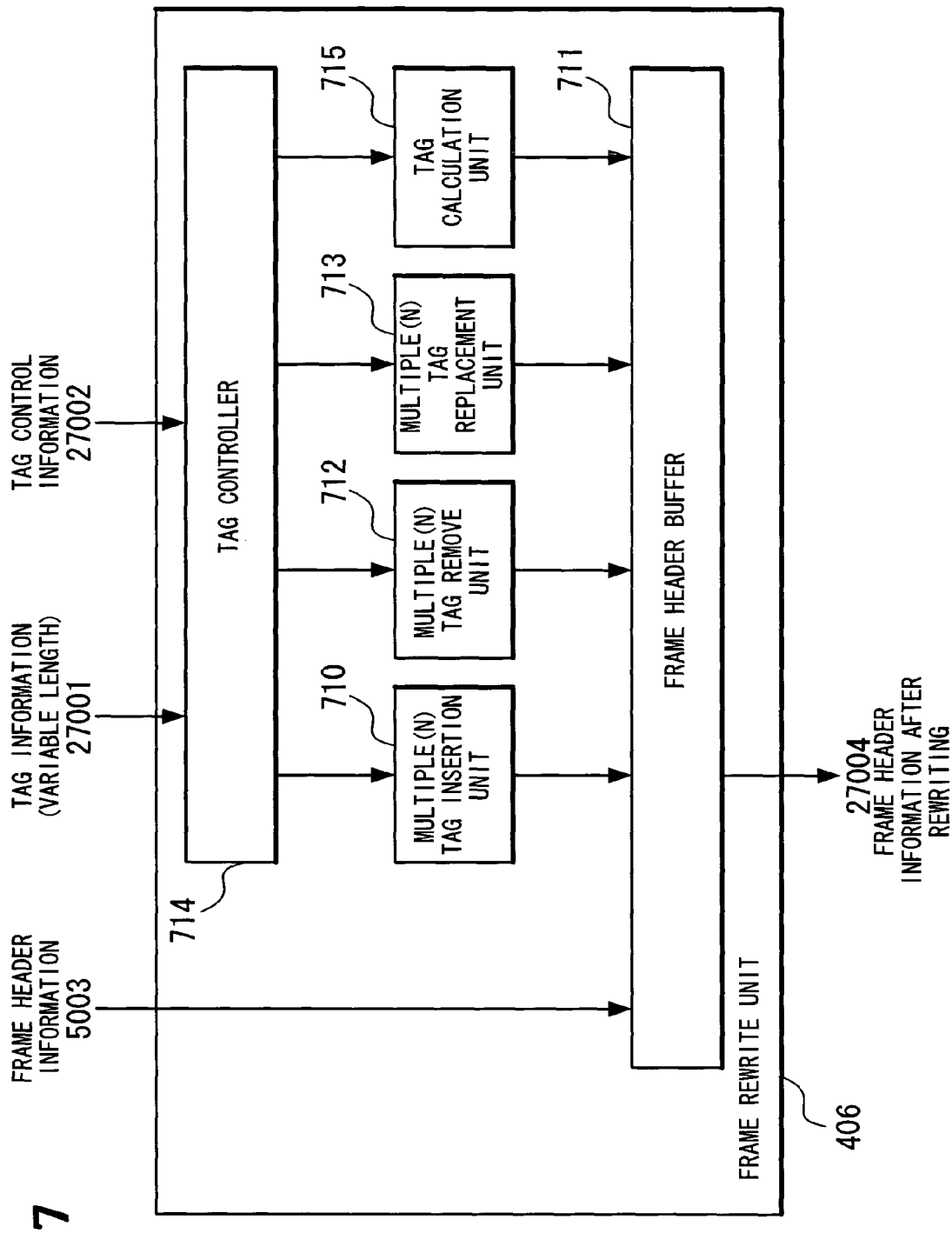
FIG. 7 is a block diagram showing the configuration of a frame rewrite unit in the packet forwarding unit.

As an embodiment of the present invention, the frame transfer taking advantage of the IEEE802.3 network control frame 20001 as shown in FIG. 16 using a tag TTL check unit 503 in the frame analyzer 402 of the present invention as shown in FIG. 3, a tag calculation unit 715, an Multiple(N) tag insertion unit 710, an Multiple(N) tag remove unit 712 and an Multiple(N) tag replacement unit 713 in the frame rewrite unit 406 as shown in FIG. 7, a table memory 410 as shown in FIG. 6, the tag format 2206 as shown in FIG. 15 and the network control tag format 2010 as shown in FIG. 17 is described below.

Figure 14:
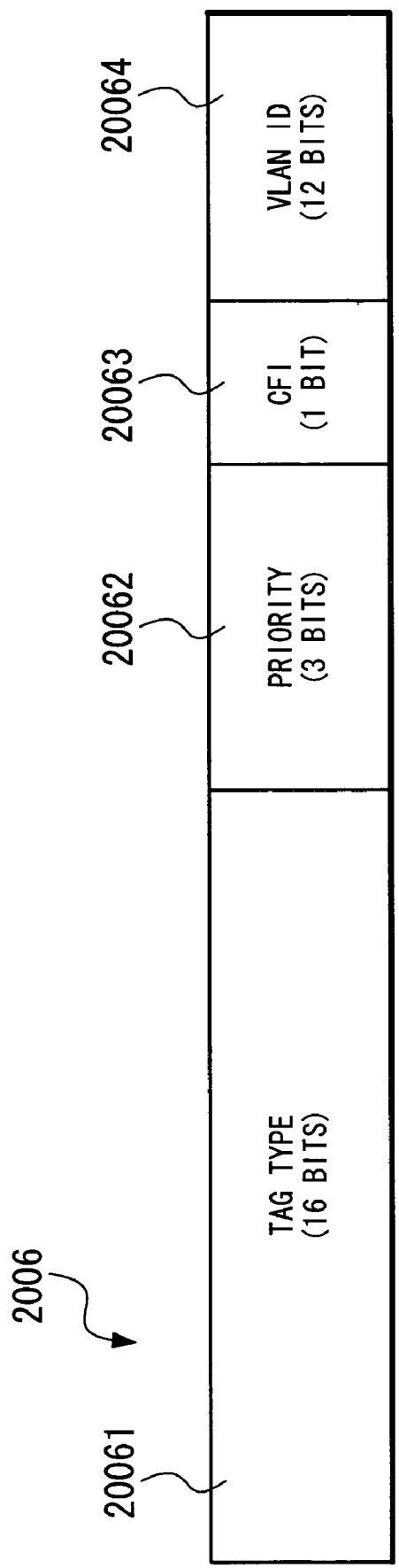
FIG. 14 is a configuration diagram of a standard VLAN tag.

The tag format 2206 as shown in FIG. 15 has a tag format configuration that stores TTL (frame survival time) information to the lower 8-bit area in the 16-bit area of the tag type 20061 according to the VLAN tag format 2006 as shown in FIG. 14.

A TTL area 22065 has a value from 0 at the minimum to 255 at the maximum. The value "255" is stored at the packet transfer start position, but it is decremented by one for every transfer by a node. The value "0" means that the frame can be discarded.

The network control frame 20001 as shown in FIG. 16 stores the network control tag 2010 in the frame transferred by the user in order for network control.

The network control tag 2010 is constituted according to the format in FIG. 17. Tag types 20101-1 and 20101-2 store the type of the network control tag as 15-bit information. An end point bit 20102-1 shows the end point of several tags stacked. A subtype 20104 is used to show more detailed type of the tag type 20101. A version 20105 shows the version information for the specification of the network control frame 20001.

These 32 bits in total are treated as an initial tag of the network control tag and followed by several tags. One tag has the information for network control and administration of 31 bits in total as network control information 20106-1 and 20106-2 and an end point bit 20102-2 showing the end point of the final tag is added.

Figure 13:
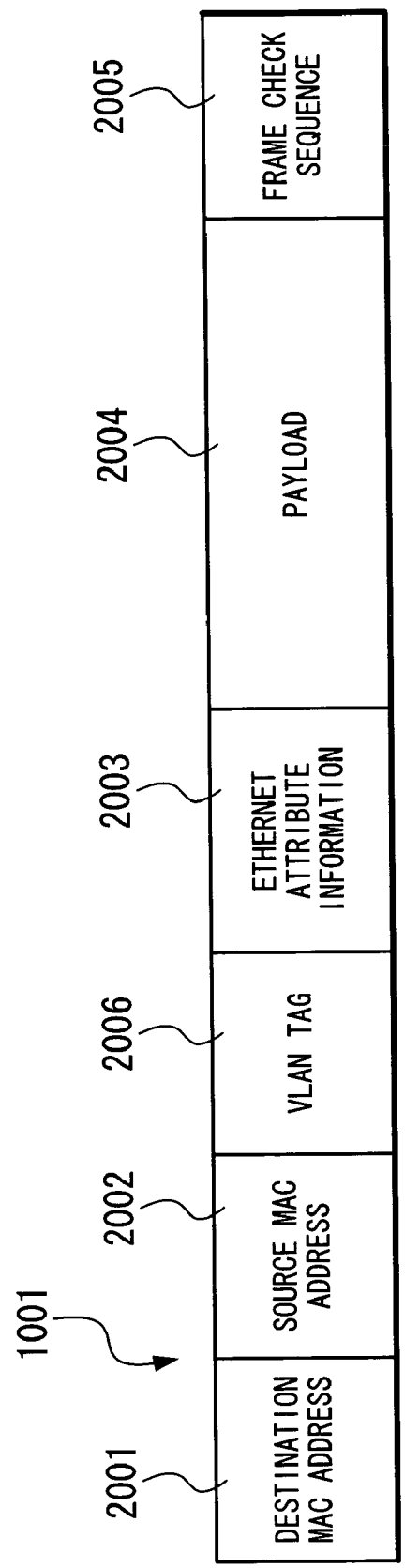
FIG. 13 is a configuration diagram of an Ethernet frame with a standard VLAN tag.

The VLAN switching hub 20 as shown in FIG. 1 is provided with at most four ports of interfaces (IF) that enable transfer of frames including Ethernet frame with VLAN tag 1001 as shown in FIG. 13 and the tag 2206 having the format shown in FIG. 15.

Figure 12:
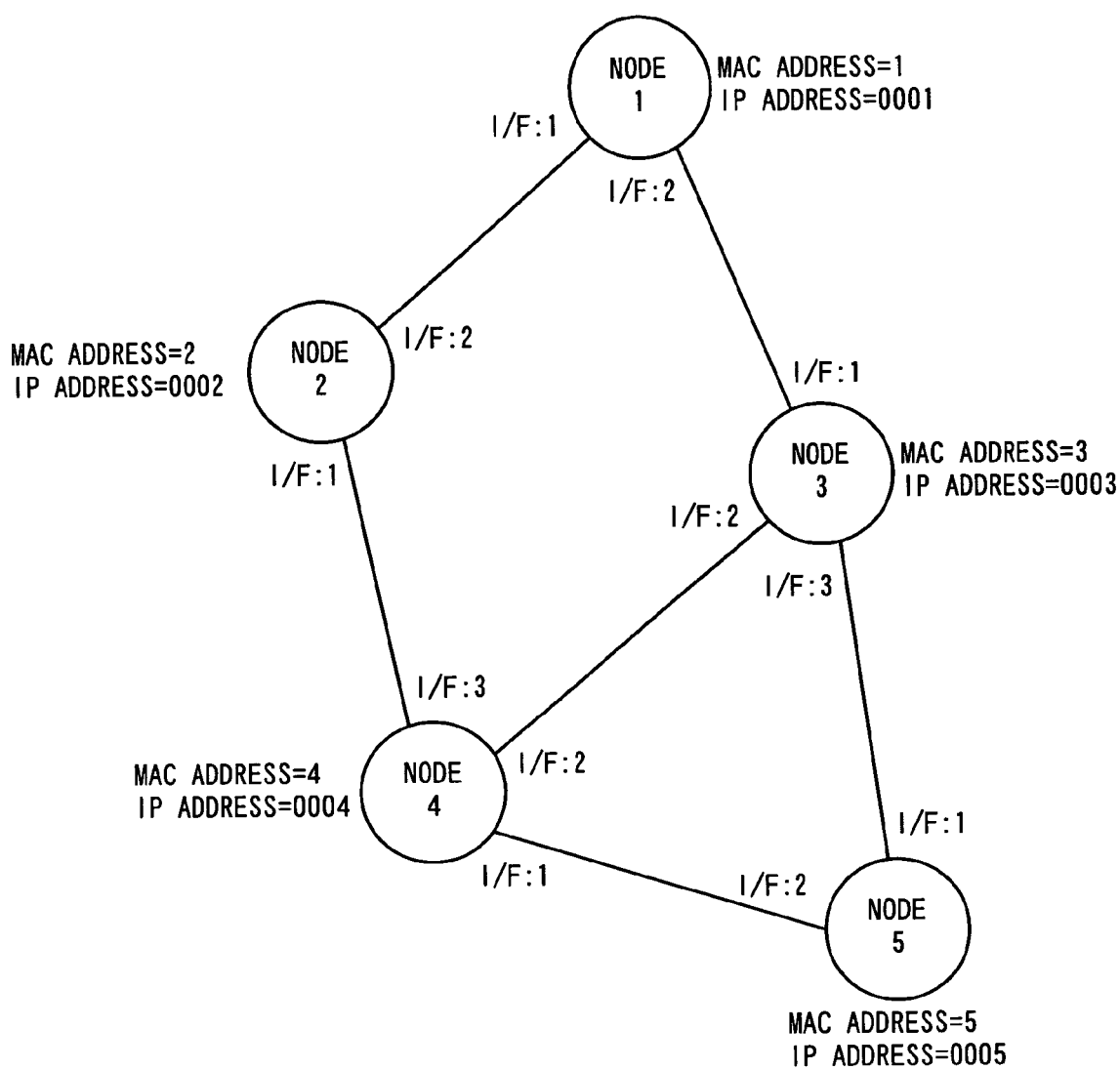
FIG. 12 is a diagram showing an example of network configuration.

The VLAN switching hub 20 is installed at the nodes 1 to 5 of the network as shown in FIG. 12 and serves for frame transfer processing.

Frame transfer from I/F:1 to I/F:2 at node 4 as shown in FIG. 12 is described below.

A frame input from I/F:1 of the VLAN switching hub 20 is, via PHY311 and MAC111, input as an input frame 4001 to the packet forwarding unit 201 as shown in FIG. 2.

In the packet forwarding unit 201, the input frame 4001 is sent to the frame type judgement unit 501 of the frame analyzer 402 in FIG. 3.

The frame type judgement unit 501 identifies the type of the input frame 4001 and sends the frame type information to the search key decision unit 504 and the header information of the input frame 4001 to the frame header analyzer 502.

The frame header analyzer 502 analyzes the header information and extracts the destination MAC address information 2001, source MAC address information 2002, VLAN tag information 2006 and Ethernet attribute information 2003 as shown in FIG. 13 from the header information.

Among the extracted header information, the VLAN tag information 2006 is sent to the tag TTL check unit 503, which is a characteristic component of the present invention, to check whether the value of the TTL area 22065 in FIG. 15 is "0" or not.

If the value of the TTL area 22065 is "0" as a result of the check, frame discard information 25003 is output and the instruction to discard the frame is sent to the frame header analyzer 502.

If the value of the TTL area 22065 is not "0", the frame discard information 25003 is not output and the frame discard instruction is not sent.

When the frame header analyzer 502 receives the instruction to discard the frame, it instructs the frame type judgement unit 501 not to output input frame information 5006 and executes the frame discarding for the input frame 4001.

When the frame discard instruction is not given, the frame header analyzer 502 outputs the frame header information 5003 and sends the header information to the search key decision unit 504.

Figure 4:
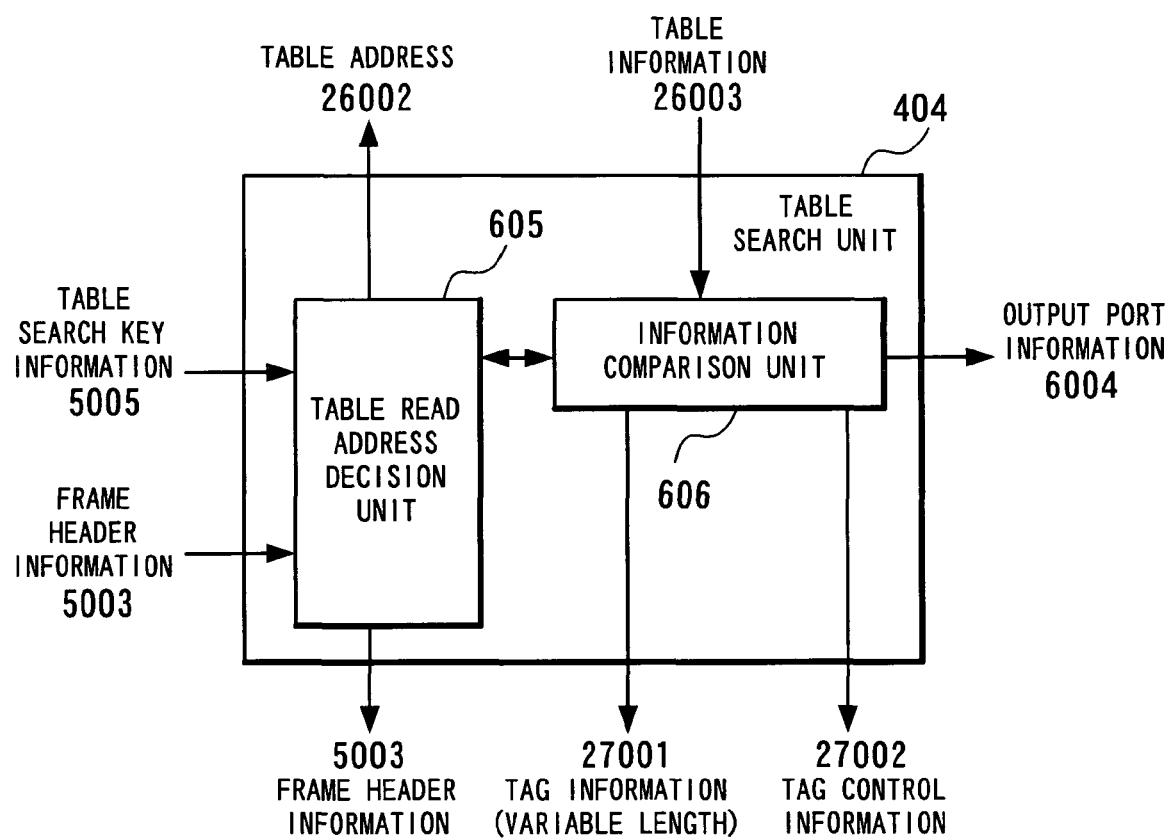
FIG. 4 is a block diagram showing the configuration-of a table search unit in the packet forwarding unit.

The search key decision unit 504 decides the port used for frame transfer and the table search key to find the processing method for the frame from the frame type and the header information and sends table search key information 5005 to the table search unit 404 in FIG. 4.

The frame type judgement unit 501 outputs the input frame 4001 as the input frame information 5006 in case any frame discard instruction is not given to the frame header analyzer 502.

In the table search unit 404 of FIG. 4, the table search key information 5005 and frame header information 5003 are input to a table read address decision unit 605.

Figure 5:
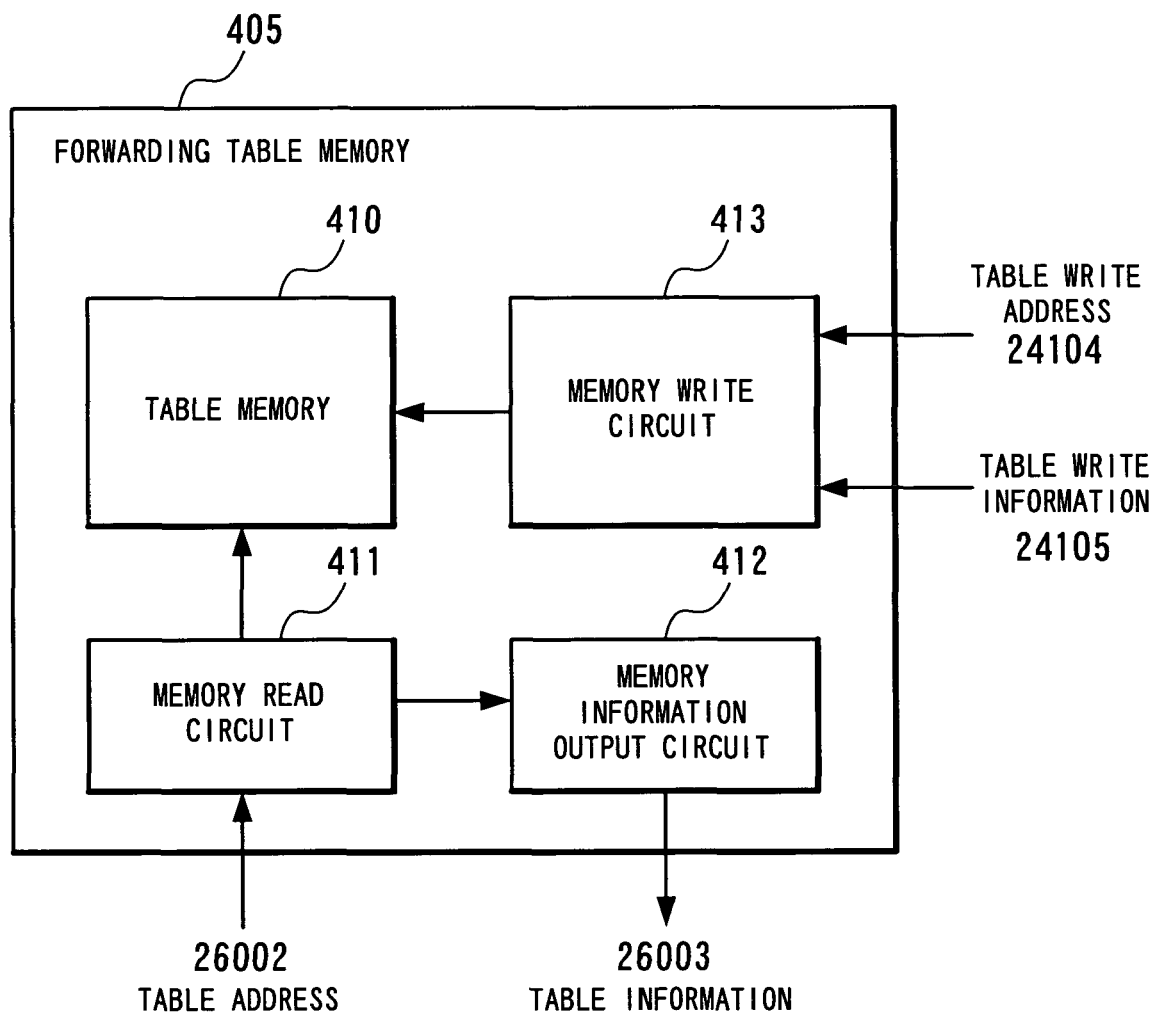
FIG. 5 is a block diagram showing the configuration of a forwarding table memory in the packet forwarding unit.

The table read address decision unit 605 estimates and calculates the address where the same information as the table search key information 5005 is stored from its information, decides the table reference address and sends a table address 26002 to the forwarding table memory 405 of FIG. 5.

The forwarding table memory 405, using the information at the table address 26002, refers to the contents of the table memory 410 with a memory read circuit 411 and sends the referred information as table information 26003 to the table search unit 404 with a memory information output circuit 412.

According to the present invention, the table memory 410 comprises a memory table as shown in FIG. 6. It stores the tag information at the first step and several pieces of tag information from the second step as well as the number of control steps required for control of several pieces of tag information and the control information. Thus, several pieces of tag information are sent to the table search unit 404 at a time as the table information 26003.

The table memory 410 as shown in FIG. 6 is described below. The table memory 410 administrates several pieces of tag information as described above. In this table, frames for insertion of the network control tag 2010 as shown in FIG. 16 are administrated and the information required for network control is sent and received.

The contents of the first entry in the table of FIG. 6 represent that, because the number of tag control steps is "4" for a frame with the source MAC address "00-00-0c-01-02-03", a four-step tag storing the operation information for network control is inserted.

Figure 10:
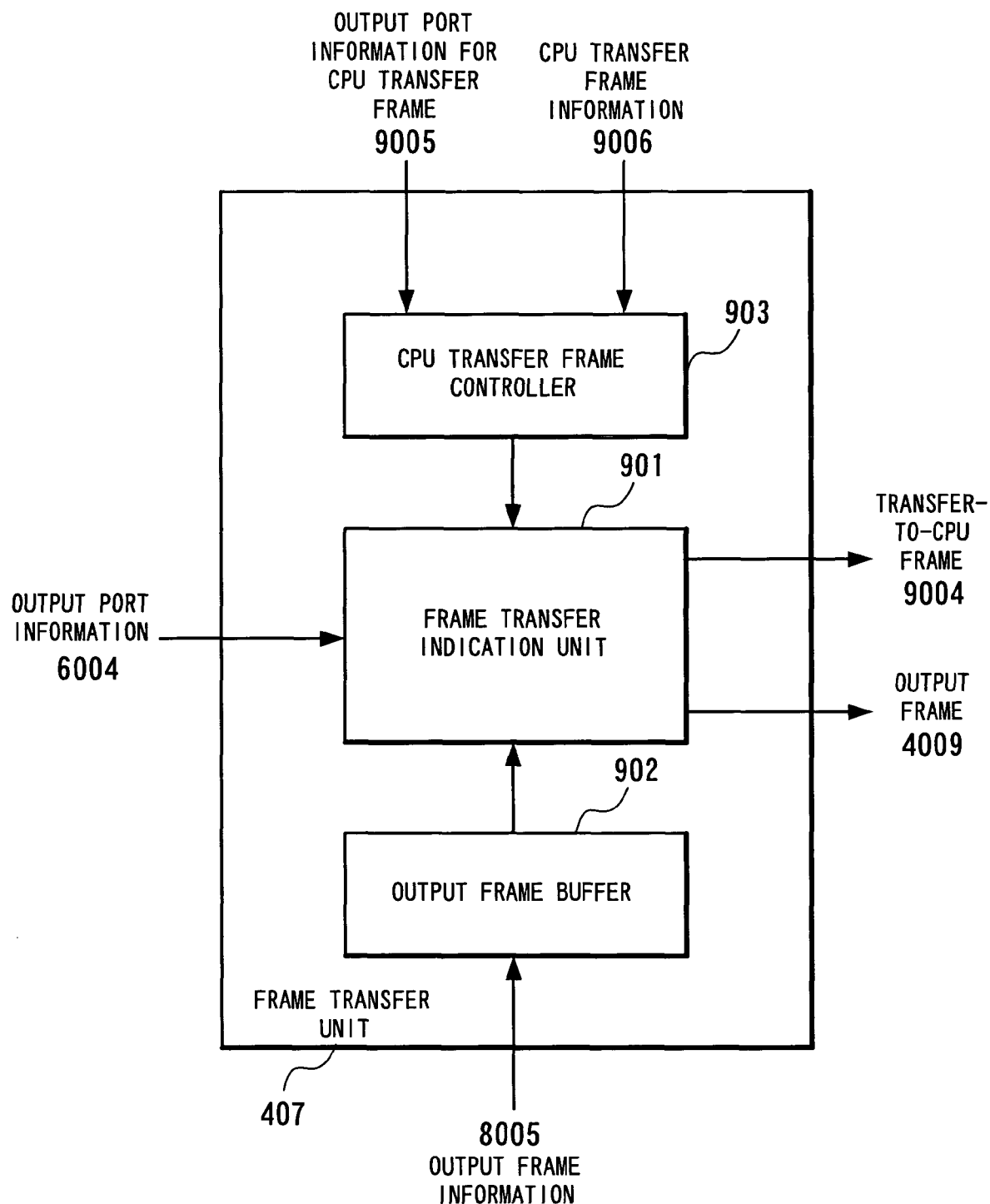
FIG. 10 is a block diagram showing the configuration of a frame transfer unit in the packet forwarding unit.

Further, the contents of the final entry in the table show that the source MAC address is "00-00-0c-01-02-05" and the frame storing the maintenance information sends the frame as a transfer-to-CPU frame 9004 shown in FIG. 10 to a CPU 408 and receives the network control information because the output port information is "0".

For table search key information 5005 used in the two cases above, the former is the MAC source address: 00-00-0c-01-02-03 and the latter is the source MAC address 00-00-0c-01-02-05 and the tag information (Maintenance information). Thus, the network control tag 2010 is stored in the transfer frame so that the information required for network control is exchanged.

The table information 26003 sent from the forwarding table memory 405 to the table search unit 404 is input to an information comparison unit 606 and compared with the table search key information 5005 to see if they are the same.

If they are the same as a result of comparison, output port information of the frame is output to output port information 6004 and the information comparison unit 606 outputs tag information 27001 and tag control information 27002 and the table read address decision unit 605 sends the frame header information 5003 both to the frame rewrite unit 406.

If they are not the same, decision of the table read address is requested again to the table read address decision unit 605 and the table information 26003 is obtained from the forwarding table memory 405 until the information equal to the table search key information 5005 is obtained.

If the same information cannot be obtained even after checking the whole area of the forwarding table memory 405, information to the CPU is sent to the output port information 6004 and the frame is transferred to the CPU 408 as the transfer-to-CPU frame 9004 as shown in FIG. 10.

In the frame rewrite unit 406 as shown in FIG. 7, a frame header buffer 711 stores information of the frame header information 5003 and the variable length tag information 27001 and the tag control information 27002 are input to a tag controller 714.

The tag controller 714 sends the tag information 27001 and the control instruction to one of the following units: the Multiple(N) tag insertion unit 710, the Multiple(N) tag remove unit 712, the Multiple(N) tag replacement unit 713 and the tag calculation unit 715 corresponding to the contents of the tag control information 27002.

Here, the Multiple(N) tag insertion unit 710, the Multiple(N) tag remove unit 712, the Multiple(N) tag replacement unit 713 and the tag calculation unit 715 in FIG. 7 are described below.

The Multiple(N) tag insertion unit 710 takes out the information from the tag information 27001 for the number of steps instructed by the tag controller 714 and inserts several tags to the header information stored in the frame header buffer 711.

Similarly, the Multiple(N) tag remove unit 712 and the Multiple(N) tag replacement unit 713 take out the information from the tag information 27001 for the number of steps instructed by the tag controller 714 and removes and replaces several tags of the header information stored in the frame header buffer 711.

Figure 8:
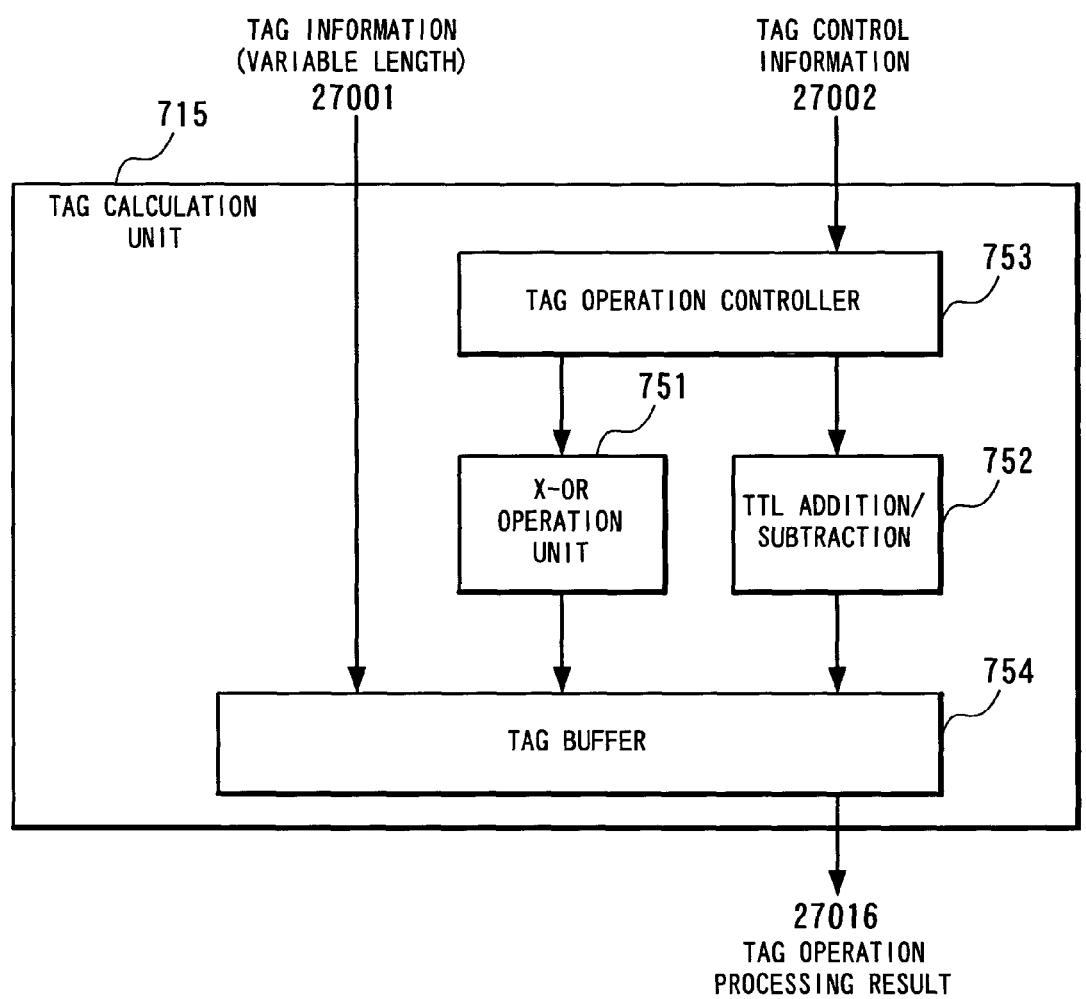
FIG. 8 is a block diagram showing the configuration of a tag calculation unit in the frame rewrite unit.

As shown in FIG. 8, the tag control information 27002 is sent to a tag operation controller 753 and the tag information 27001 is sent to a tag buffer 754 in the tag calculation unit 715.

The tag operation controller 753 sends a control instruction to an X-OR operation unit 751 and a TTL addition/subtraction unit 752 corresponding to the contents of the tag control information 27002.

When the control instruction is sent, the X-OR operation unit 751 executes X-OR operation and the TTL addition/subtraction unit 752 executes addition or subtraction for a part of the tag buffer 754. The operation result is sent as the tag operation processing result 27016 to the frame header buffer in FIG. 7.

The TTL addition/subtraction unit 752 decrements the contents by one every time the frame transfer is executed for the TTL area 22065 shown in FIG. 15.

Thus, even when a route control that circulates in the network for a long time is executed, the frame is surely discarded after transfer for 255 times in the VLAN switching hub 20 according to the functions of the TTL addition/subtraction unit 752 and the above tag TTL check unit 503 as shown in FIG. 3.

Figure 9:
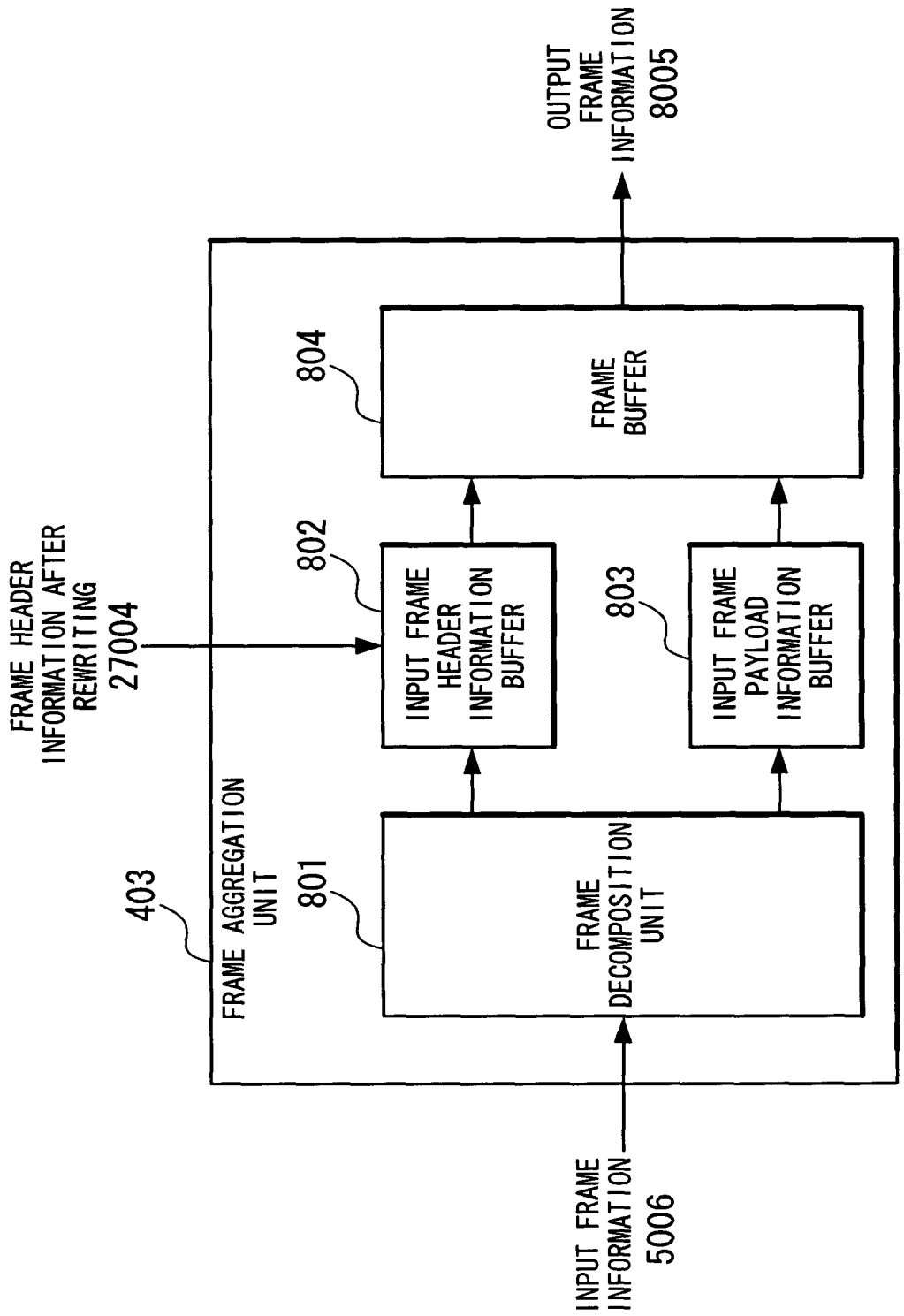
FIG. 9 is a block diagram showing the configuration of a frame aggregation unit in the packet forwarding unit.

At the Multiple(N) tag insertion unit 710, the Multiple(N) tag remove unit 712, the Multiple(N) tag replacement unit 713 and the tag calculation unit 715 in FIG. 7, the changed frame header buffer 711 is, after processing completion, rewritten and sent as frame header information 27004 to the frame aggregation unit 403 as shown in FIG. 9.

At the frame aggregation unit 403 in FIG. 9, input frame information 5006 is input from the frame analyzer 402 in FIG. 3 to a frame decomposition unit 801.

At the frame decomposition unit 801, the input frame information 5006 is decomposed to the header information and the payload information and the respective information is output to an input frame header information buffer 802 and an input frame payload information buffer 803. If the frame header information 27004 is sent after frame rewriting, however, the input frame header information buffer 802 replaces the header information with the frame header information 27004 after frame rewriting.

After that, the input frame header information buffer 802 and the input frame payload information buffer 803 output the data to a frame buffer 804. Thus, the header and the payload section are synthesized and output frame information 8005 is sent to the frame transfer unit 407 in FIG. 10.

The frame transfer unit 407 in FIG. 10 stores the output frame information 8005 sent from the frame aggregation unit 403 to an output frame buffer 902.

After that, a frame transfer indication unit 901 takes out the frame from the output frame buffer 902 and outputs the output frame 4009 to the port obtained from the output port information 6004 sent from the table search unit 404 in FIG. 4

In this embodiment, the output port information stores the information of I/F:2 and the frame is output from the I/F:2 for the output frame 4009. If the output port information 6004 is addressed to the CPU, the frame is output to the transfer-to-CPU frame 9004.

In addition, the frame transfer indication unit 901 also processes the frame sending from the CPU 408. For the frame sending from the CPU 408, a network control program 913 of the CPU 408 as shown in FIG. 11 creates a frame and sends output port information 9005 for CPU transfer frame and CPU transfer frame information 9006 to a CPU transfer frame controller 903 in FIG. 10.

After that, the CPU transfer frame controller 903 sends the frame information and the output port information and instructs the frame transfer indication unit 901 to send the frame.

Figure 11:
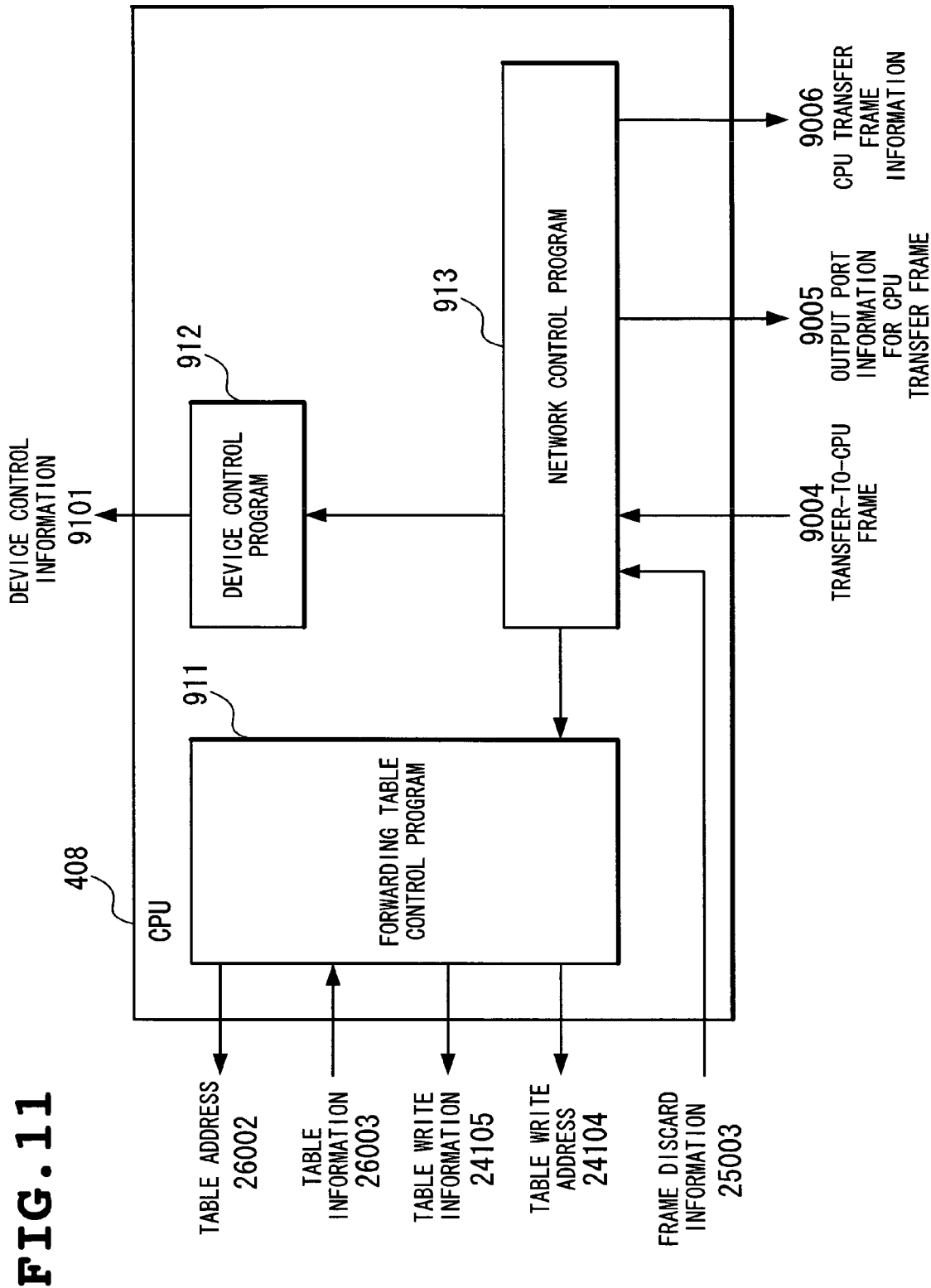
FIG. 11 is a configuration diagram of a CPU in the VLAN switching hub.

The CPU 408 as shown in FIG. 11 is described below. In the CPU 408, the network control program 913 for network control is operating and a forwarding table control program 911 that processes the frame transmission from the CPU as described above and operates the information from the forwarding table memory 405 and the table memory 410 as shown in FIGS. 5 and 6 described above is operating.

The forwarding table control program 911 outputs, according to the instruction from the network control program 913, the information required for network control including the table write information 24015 and the table write address 24014 to the table memory 410 and thus controls sending and receiving of the information required for network control. In addition, a device control program 912 also runs on the CPU 408. The device control program 912 outputs device control information 9101, which is the information for device control, according to the network control program 913.

Though the present invention has been described with showing preferred embodiments and examples so far, it is not limited to the above embodiments and the examples. It can be embodied with various changes without departing from the technological spirit of the invention.

As described above, excellent effects as shown below can be obtained by the present invention.

By realizing the function to insert the network control tag storing the network control information into the user frame, transmission of the network control information becomes available even while the user is using the network.

By storing the network control frame in tags, the network control information can be sent in the minimum size without being restricted by the minimum frame size of 64 bytes according to Ethernet standard and thereby suppression of the network bandwidth can be minimized.

With a circuit to process several tags and a table administration method to administrate several tags, it becomes possible to give several tags in frame transfer, which enables sending of a large amount of information such as network control information as tags.

With a TTL field provided in the tag to be processed at the date link layer, it becomes possible, through subtraction and checking by a TTL check circuit and a tag operation circuit, to discard the frame during VLAN packet transfer at the data link layer even when a looped network is formed. Thus, occupation of the network by looped packets or oppression of the packet memory in the system is prevented, which results in prevention of unstable network.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

The invention claimed is:

1. A node in an Ethernet network to relay a modified Ethernet frame, comprising:
   an element which inserts two or more VLAN tags into said frame and removes an other VLAN tag in a relay process of said frame,
   wherein said frame comprises an Ethernet frame, as modified such that network control information is selectively stored to said VLAN tags and said network control information is not restricted to a 64-byte minimum frame size restriction of network control information, as defined by a standard of said Ethernet.

2. A node as set forth in claim 1, further comprising:
   an element which replaces two or more VLAN tags of said frame at a time.

3. A node as set forth in claim 1, further comprising:
   an element which administrates said two or more VLAN tags using a forwarding table memory for a change of frame contents during a frame relay.

4. A node as set forth in claim 1, further comprising:
   an element which searches a forwarding table memory using an information from two or more VLAN tags in said frame during a frame relay.

5. A node as set forth in claim 1, further comprising:
   an element which searches a forwarding table memory in a relay process of said frame with a combination of an information from two or more VLAN tags in said frame and an input port, a destination MAC address, a source MAC address and a TYPE field information.

6. A node as set forth in claim 1, further comprising an element which:
   provides a TTL area to show a survival time of a frame in said VLAN tag inserted to said frame;
   checks whether said survival time has elapsed or not by a value in said TTL area; and
   discards said frame after elapse of said survival time without relaying said frame in a relay process of said frame.

7. A node as set forth in claim 6, further comprising:
   an element which decrements the value in said TTL area by one every time said frame is relayed.

8. The node of claim 1, wherein said network control information comprises 32-bit network control tags.

9. A node as set forth in claim 1, further comprising:
   an element which changes a self-node status administration corresponding to a content of said VLAN tag.

10. A node as set forth in claim 1, wherein
    a node status is stored to an area of said VLAN tag in the relayed frame corresponding to a self-node status.

11. A frame transfer method of a node in an Ethernet network to relay a modified Ethernet frame, said method comprising:
    receiving said frame in said node, said frame comprising an Ethernet frame as modified such that network control information can selectively be stored to a VLAN tag, said network control information not being restricted to a 64-byte minimum frame size restriction of network control information, as defined by a standard of said Ethernet;
    inserting two or more VLAN tags into said frame and removing at least one other VLAN tag from said frame in a relay process of said frame; and
    forwarding said frame.

12. A frame transfer method as set forth in claim 11, wherein
    a forwarding table memory for frame contents change during a frame relay is used for administration of said two or more VLAN tags.

13. A frame transfer method as set forth in claim 11, wherein
    a forwarding table memory is searched during a frame relay using an information from two or more VLAN tags in said frame.

14. A frame transfer method as set forth in claim 11, wherein
    a forwarding table memory is searched in a relay process of said frame with a combination of an information from two or more VLAN tags in said frame and an input port, a destination MAC address, a source MAC address and a TYPE field information.

15. A frame transfer method as set forth in claim 11, wherein:
    a TTL area to show a survival time of the frame is provided in said VLAN tag that is inserted to said frame;
    whether said survival time has been elapsed or not is checked by a value in said TTL area; and
    said frame after elapse of said survival time is discarded without being relayed in the relay process of said frame.

16. A frame transfer method as set forth in claim 15, wherein the value in said TTL area is decremented by one every time said frame is relayed.

17. A frame transfer method as set forth in claim 11, wherein
    a node status is stored to said VLAN tag area in the relayed frame corresponding to a self-node status.

18. A frame transfer method as set forth in claim 11, further comprising:
    changing a self-node status administration corresponding to contents of said VLAN tag.

* * * * *